Figure 1:
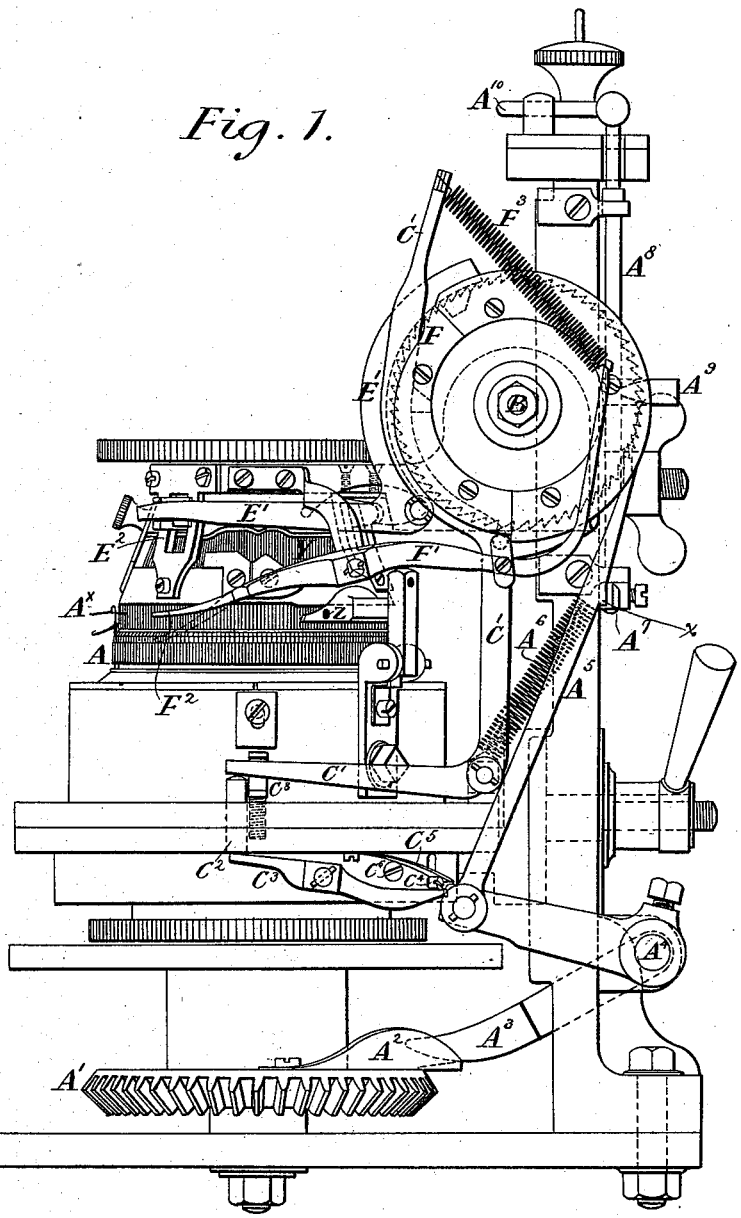

(No Model.) 8 Sheets—Sheet 1.

J. H. COOPER & G. BLUNT.
CIRCULAR RIB KNITTING MACHINE.

No. 412,600. Patented Oct. 8, 1889.

Witnesses
Baltus DeLong
N. H. Smith

Inventors
John Harris Cooper,
George Blunt.
By their attys,
Baldwin Davidson & Wight (No Model.) 8 Sheets—Sheet 2.
J. H. COOPER & G. BLUNT.
CIRCULAR RIB KNITTING MACHINE.
No. 412,600. Patented Oct. 8, 1889.
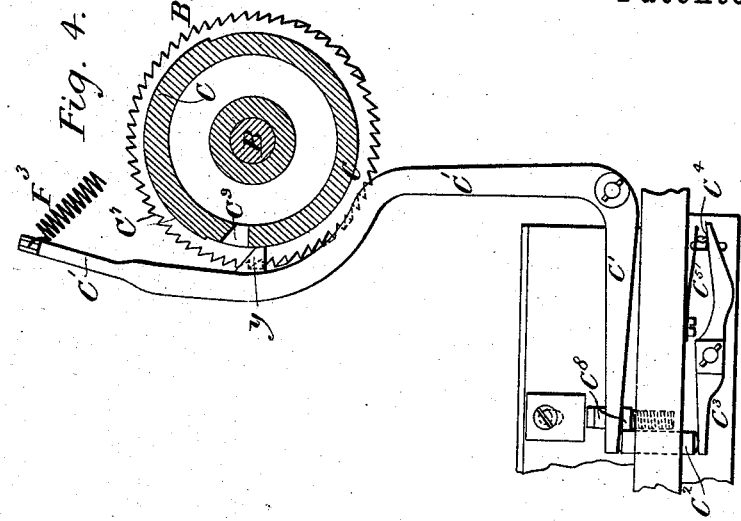
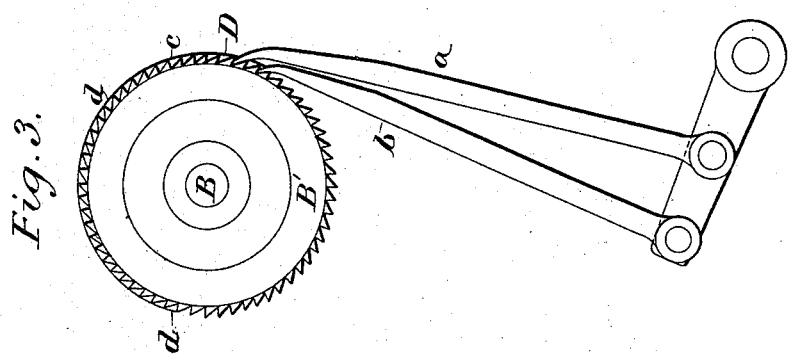
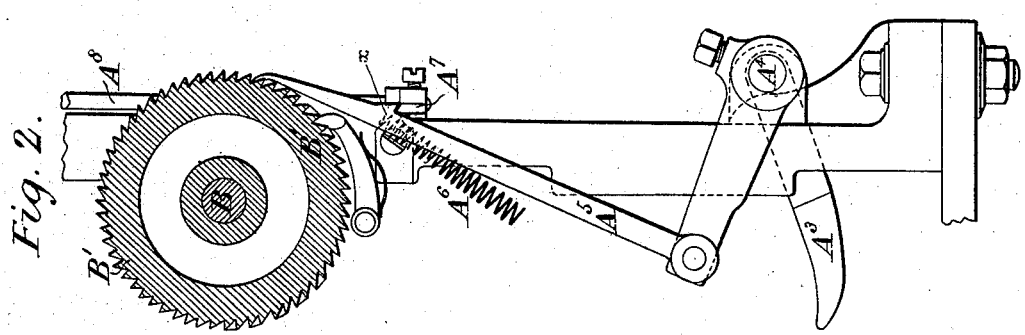
Witnesses
Baltus DeLong
N. H. Smith
Inventors
John Harris Cooper
George Blunt
By their attys
Baldwin Davidson & Wight (No Model.) 8 Sheets—Sheet 3.
J. H. COOPER & G. BLUNT.
CIRCULAR RIB KNITTING MACHINE.
No. 412,600. Patented Oct. 8, 1889.
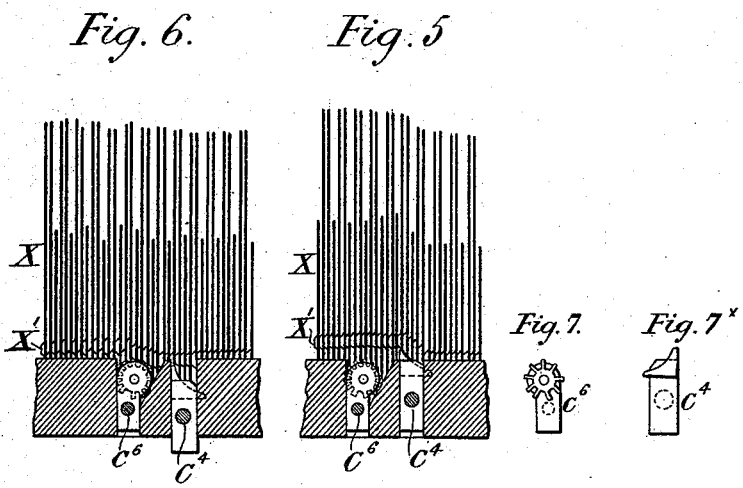
Witnesses
Baltus De Lang
N. H. Smith
Inventors
John Harris Cooper
George Blunt
By their attys.
Baldwin Davidson & Wight (No Model.) 8 Sheets—Sheet 4.

J. H. COOPER & G. BLUNT.
CIRCULAR RIB KNITTING MACHINE.

No. 412,600. Patented Oct. 8, 1889.

Witnesses
Baltus L. Long.
A. H. Smith

Inventors
John Harris Cooper
George Blunt
By their attys
Baldwin Davidson & Wight (No Model.) 8 Sheets—Sheet 5.

J. H. COOPER & G. BLUNT.
CIRCULAR RIB KNITTING MACHINE.

No. 412,600. Patented Oct. 8, 1889.

(No Model.) 8 Sheets—Sheet 6.

J. H. COOPER & G. BLUNT.
CIRCULAR RIB KNITTING MACHINE.

No. 412,600. Patented Oct. 8, 1889.

Witnesses.
Baltus DeLong.
C. M. Brother.

Inventors.
John Harris Cooper.
George Blunt.
By their Attys
Baldwin Davidson & Wright.

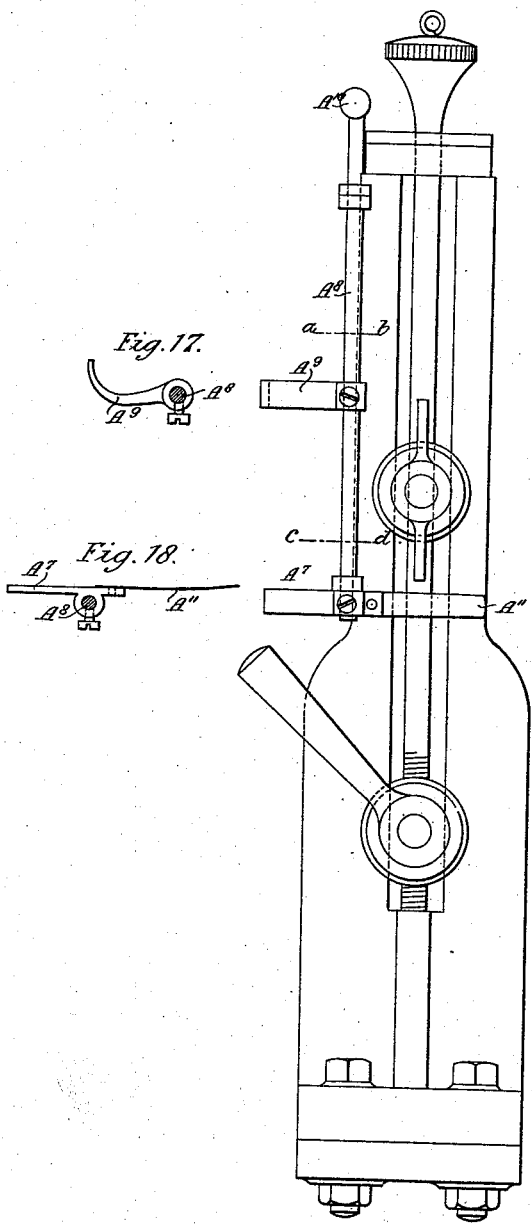

(No Model.) 8 Sheets—Sheet 8.
J. H. COOPER & G. BLUNT.
CIRCULAR RIB KNITTING MACHINE.
No. 412,600. Patented Oct. 8, 1889.
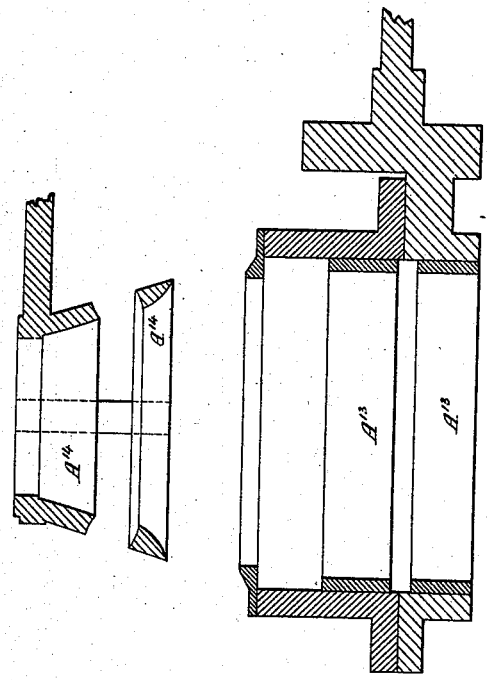
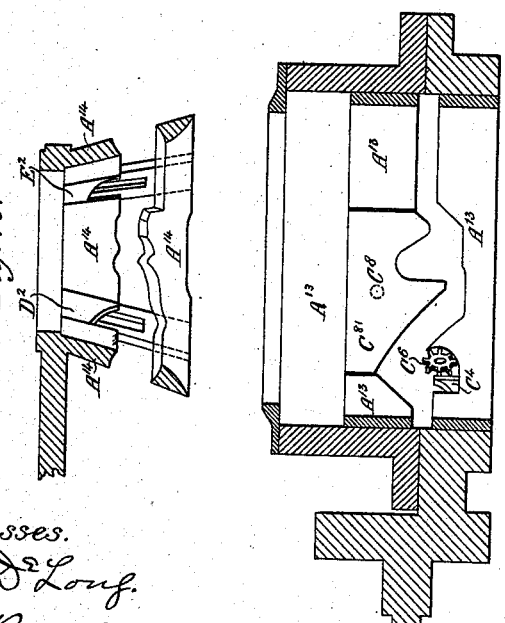
Witnesses.
Inventors.
John Harris Cooper.
George Blunt.
By their Atty's.
Baldwin Davidson & Wight

UNITED STATES PATENT OFFICE.

JOHN HARRIS COOPER AND GEORGE BLUNT, OF LEICESTER, ENGLAND.

CIRCULAR RIB KNITTING MACHINE.

SPECIFICATION forming part of Letters Patent No. 412,600, dated October 8, 1889.

Application filed February 12, 1889. Serial No. 299,611. (No model.) Patented in England May 3, 1886, Nos. 5,998 and 5,999.

*To all whom it may concern:*

Be it known that we, JOHN HARRIS COOPER, hosiery-manufacturer, and GEORGE BLUNT, machinist, subjects of the Queen of Great Britain, both residing at St. Margaret's Works, Leicester, England, have invented certain new and useful Improvements in Circular Rib Knitting Machines, (for which we have received Letters Patent in Great Britain, No. 5,998, dated May 3, 1886, and No. 5,999, dated May 3, 1886,) of which the following is a specification.

The object of this invention is to produce the welts of stockings and such like knitted work automatically upon circular-knitting machines.

For producing a welt we cause, as hereinafter explained, a fast course to be produced and arrest the knocking over of the loops on the machine-needles for one course, so that each machine-needle then has two loops upon it. After this course the machine or rib needles are held back and entirely out of action, and work is produced on the frame-needles only for as many courses as may be desired. As these courses are being produced we cause a push-back blade to descend between the frame and machine-needles, to hold down the work between them. Afterward, to complete the welt, the push-back blade is made to rise and the machine or rib needles are again brought into action. The loops of old work upon them are knocked off, and the production of ordinary ribbed work is proceeded with until it is required to make another welt. The movements of the parts for effecting these operations are controlled by cams on a cam-axis, to which a step-by-step revolving motion is imparted while a welt is being formed. Part or the whole of a revolution of this cam-axis completes the welt.

For the production of a fast course at the commencement of forming a welt the loops of work on alternate needles or on some needles are, as usual, left upon the needles and not knocked over until the next course. We effect this in the following manner: The lifting-cam (that is, the cam which lifts the needles so that their latches may come above the loops of work to allow these loops to be knocked off from the needles when the needles descend) we so form that whenever a fast course is to be produced its upper or highest point can be drawn back or lowered and put out of action, so that none of the needles lifted by it will then be raised high enough for the work to pass below the latches, and in order to then raise every alternate needle or some of the needles to the requisite height for the work upon them to come below the latches, we employ a small notched or toothed wheel, with which the nebs or projections on the needle-bits come into contact when the movable portion of the cam is drawn back or lowered and out of action. If alternate needle-bits are to be so raised, then the neb of one needle-bit is made to come onto the top of one tooth and to be lifted by it to a sufficient height to clear its loop, and the neb on the next needle-bit is made to come into the hollow between that tooth and the next, and so on, the wheel rotating by the action of the needle-nebs as the needle-nebs move past it.

For a two-and-one rib made with every third needle out of the frame and with the frame-cylinder cut uniformly all round, we employ a needle-bit without a needle for each third needle so removed to help in rotating the wheel. Similarly, for other ribs blank needle-bits may be used wherever required.

By the expression "needle-nebs" we mean the projections common to all hosiery-needles, whether on the needle-stem itself or when a jack is employed.

The drawings annexed show our improvements.

Figure 12:
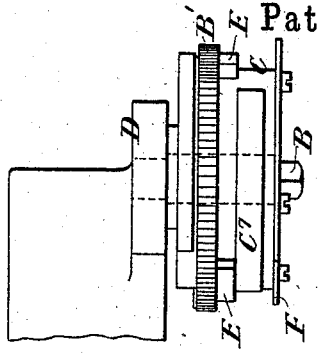
Figure 11:
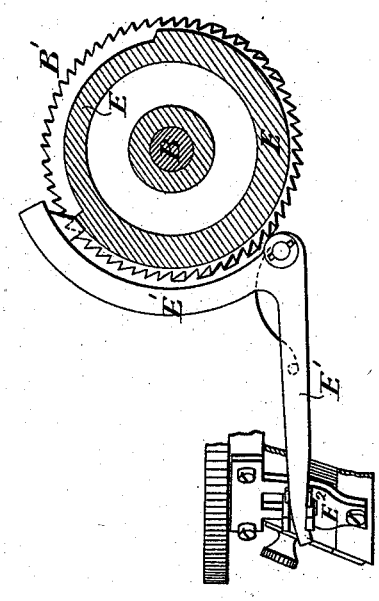
Figure 8:
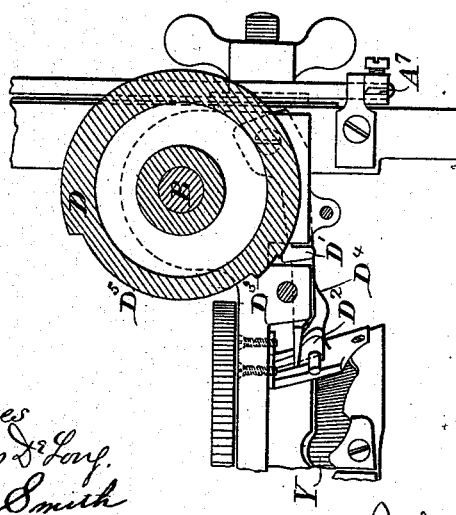
Figure 9:
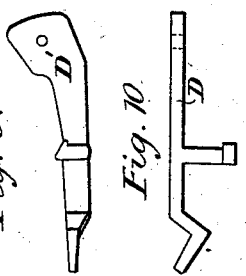
Figure 10:
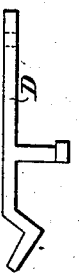
Figure 13:
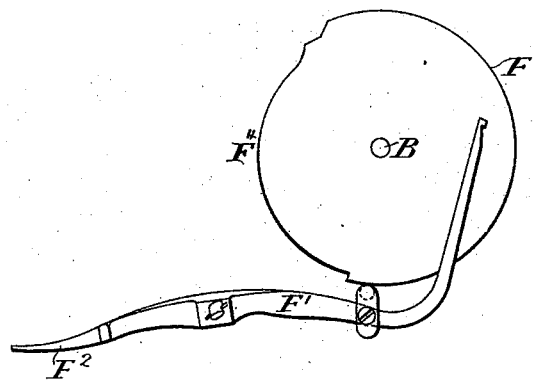
Figure 14:
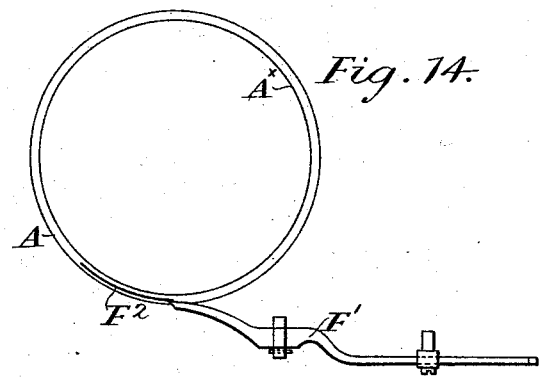
Figure 15:
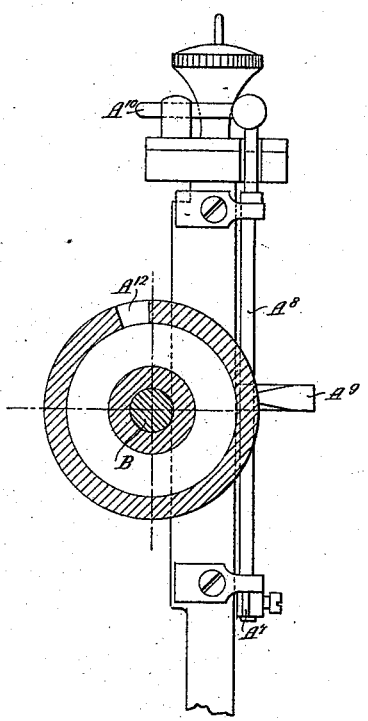

Figure 1 is a side elevation of a circular-knitting machine of well-known type for producing ribbed work and having our improvements applied to it; Fig. 2, a separate view of the parts for transmitting a step-by-step revolving motion to the cam-shaft which carries the cams used for forming a welt; Fig. 3, a separate view of parts which may be used for the same purpose if rib tops only are to be made in the machine; Fig. 4, a separate view of parts used for causing a fast or locking course to be produced; Fig. 5, a sectional view of the lifting or clearance cam used with the frame-needles in working position and the toothed wheel, which is alongside of it, out of action; Fig. 6, a similar view with the point of the lifting or clearance cam lowered and the toothed wheel in action to raise alternate needle-stems. Fig. 7 is a separate view of the toothed wheel and the piece that carries it; Fig. 7×, a separate view of the clearance or lifting cam and the slide by which it is carried. Fig. 8 is a sectional view of the parts by which the knocking over of the work on the machine or rib needles is first arrested for one course of work and the machine or rib needles then held back and out of action for as many courses as may be desired. Figs. 9 and 10 are separate views of the lever D'. Fig. 11 is a sectional view of the parts by which the cam for first thrusting forward the machine or rib needles is put out of action while a welt is being formed. Fig. 12 is a plan view of the cam or pattern wheel. Fig. 13 is a side elevation of the parts for giving motion to the push-back blade while a welt is being produced. Fig. 14 is a plan view of the frame-needles with the push-back descending just inside them. Fig. 15 is a vertical section, and Fig. 16 a rear end elevation, of the parts by which the cam-axis B is kept at rest during the times that plain work is required to be made upon the machine. Fig. 17 is a cross-section through the line $a\,b$, Fig. 16; and Fig. 18, a cross-section through the line $c\,d$. Figs. 19 and 20 are vertical sections taken in the same plane, but seen from opposite directions, of the cams used for working the machine and frame needles.

A is the revolving cylindrical head of frame-needles; A×, the revolving conical head of machine-needles. They are made to revolve simultaneously in the ordinary manner, and as they revolve the needles in each head are moved endwise to and fro by cams or inclines, as is well understood.

$A^{13}$ are the cams for working the frame-needles, and $A^{14}$ the cams for working the machine-needles. (See Fig. 9.)

To permit of a welt being formed automatically whenever desired, the toothed wheel A', by which the head A is revolved, has fixed upon it a cam-piece $A^2$, to give a step-by-step revolving motion to a cam or pattern wheel on the axis B. The parts by which this motion is imparted to the pattern-wheel are shown separately at Fig. 2. At each revolution of the wheel A' the cam $A^2$ upon it acts upon an arm $A^3$, carried by an axis $A^4$. Another arm on this axis carries a pawl or clawker $A^5$, which by a spring $A^6$ is held against the circumference of a ratchet-wheel B', and each time that the pawl or clawker $A^5$ is raised by the action of the cam $A^2$ it (in the machine shown) turns the ratchet-wheel a distance of two teeth.

When the machine is required to produce a length of work without any welt in it, then the pawl $A^5$ is held up in its highest position, so that it is no longer raised and lowered by the action of the cam $A^2$. The holding up of the pawl is effected by an arm $A^7$ (see Figs. 1 and 16) on a vertical axis $A^8$, which by a spring $A^{11}$ is constantly tending to turn into a position to bring the arm $A^7$ below a tooth or projection $x$ on the back of the pawl. When it does so it holds the pawl up. At this time the end of another arm $A^9$ on the vertical axis $A^8$ enters a recess $A^{12}$ (see Fig. 15) in the cam-wheel on the axis B.

When a welt is to be formed, the vertical axis $A^8$ has a partial turn given to it by hand by the lever-arm $A^{10}$. The pawl then drops and has a reciprocating up and down motion given to it by the cam $A^2$. At its first upward movement it turns the ratchet-wheel a distance of two teeth, and when it has done so the recess in the cam-wheel into which the end of the arm $A^9$ previously entered has moved away, and when the lever-handle $A^{10}$ is released and the end of the arm again drawn toward the cam-wheel the end of the arm comes against the circumference of this wheel and is stopped by it, so that the arm $A^7$ cannot turn into a position to catch and uphold the pawl, and it is retained from doing so until the cam-wheel has made one complete revolution. The end of the arm $A^9$ then again drops into the recess $A^{12}$ before mentioned and the pawl is again caught and upheld, and the machine again goes on producing ordinary ribbed work.

As will be seen by the drawings of the cam-surfaces of the pattern-wheel, somewhat less than half a revolution only of the pattern-wheel is required for forming a welt. During the remainder of the revolution ordinary ribbed work is produced. From this it follows that if between the formation of succeeding welts it is only desired to make a comparatively short length of ribbed work, as when making what are known as "rib tops," then the pattern-wheel might be arranged to revolve continuously step by step, but to revolve slowly during the time that ordinary work is being produced. This motion may be given to the pattern-wheel by the use of two pawls, as shown at Fig. 3, one (marked $a$) to turn the ratchet-wheel one tooth at a time, the other (marked $b$) to turn it two or, it might be, more teeth, according to the size of teeth used. During the time that ordinary work is being made the pawl $b$ may be prevented from engaging with the teeth of the ratchet-wheel by a projecting guard-rim $c$ around part of the circumference of the ratchet-wheel. The pawl, being wider than the ratchet-wheel, will rest on the guard-rim, and so be kept out of action; but the pawl $a$, being narrower, will not be interfered with by the guard-rim, and will turn the ratchet-wheel one tooth at each of its upward movements. When by the rotation of the pattern-wheel it has been brought into position to commence the formation of a welt, a fast course is made in the work formed on the frame-needles, or more fast courses may be made on these needles.

In the drawings the cam is formed to make one fast course only. The parts used for effecting this are shown separately at Figs. 4, 5, 6, 7, and 7$^\times$. In these and in the various other views, hereinafter referred to, of separate parts the cams are shown in position just before commencing to form a welt and ready to commence to form a welt when they make their next movement.

In Fig. 1 the parts are shown in position after a welt has commenced to be formed. A depression $C^9$ in the cam C on the axis B comes opposite to a projection $y$ upon a lever $C'$, and allows the spring $F^3$ to turn the lever on its axis and allow a plunger $C^2$, which it before held down, to rise. This again, by allowing a lever $C^3$ to turn on its axis, permits the point of the lifting or clearance cam $C^4$ to be drawn downward (see Figs. 5 and 6) by the action of a spring $C^5$. When the point of the cam $C^4$ is so drawn down, the nebs $X'$ of the frame needle-bits X come on to a small toothed wheel $C^6$.

The machine shown in the drawings being arranged to make a two-and-one rib, every third needle-bit carries no needle. As the needle-bits pass the wheel every alternate needle-bit is raised by its neb coming upon the top of one of the teeth of the wheel, and the needles carried by them are raised sufficiently for the loop of work upon them to pass below the end of the latch, while, the nebs of the other needle-bits being received into the spaces between the teeth of the wheel, the needles carried by them will not be raised sufficiently for the loops of work on them to get below the latches, and consequently these loops will not pass off from the needles when the needles are subsequently drawn downward, and so a tuck course will be produced. When the formation of the tuck course or courses has been completed, the lever $C'$ is, by the next movement of the cam C, again caused to depress the plunger $C^2$, and thereby move back the point of the cam $C^4$ to its former position, and so put the wheel $C^6$ out of action. If desired, a slight projection $C^7$ on the cam-wheel may at the same time cause the lever $C'$ to depress a projection $C^8$ from the knocking-over cam $C^{81}$, and by drawing down this cam cause the needles to draw downward a longer loop of thread, and so cause slacker work to be produced while the welt is being formed. Z is the thread-eye through which thread is conducted onto the needles. At the same time that the tuck course is commenced on the frame-needles, or it might be before or after commencing this course, the knocking over of the work on the machine or rib needles Y is arrested, so that after the completion of a course there will be two loops upon each of the needles. The parts by which this is effected are shown separately at Figs. 8, 9, and 10. A depression $D^3$ on the cam D comes opposite to the lever $D'$ and allows a spring $D^4$ to raise the point of the clearance-cam $D^2$. The clearance-cam is the cam by which the machine-needles are thrust forward to carry the latches of the needles beyond the loops, so that they may be cast off when the needles are next drawn back. By raising the point of this cam the needles are no longer thrust forward by it sufficiently to clear their latches, and so the loops will remain on the needles and not be cast off. Afterward, at the end of the course of work, a deeper depression $D^5$ in the cam D, coming opposite to the lever $D'$, allows the lever to lift the clearance-cam $D^2$ sufficiently to put it entirely out of action, so that the needles are not thrust forward at all by it, and the needles remain back entirely out of work for the next eight or nine courses, or for as many courses as may be desired. At the same time that the clearance-cam $D^2$ is partially drawn back the cam $E^2$, by which the machine-needles have previously been partially thrust forward, is also raised and put entirely out of action. The parts for effecting this are shown separately at Fig. 11. A cam E on the cam or pattern wheel acts on a lever $E'$, and this acts upon the cam $E^2$. At the same time that the formation of the welt commences, the push-back blade $F^2$ is caused to bear downward upon the work between the frame-needles and machine-needles. The parts for doing this are shown clearly in Fig. 1 and Figs. 13 and 14. The blade is carried by a lever $F'$, which by a spring $F^3$ is held up to a cam F. A depression $F^4$ in the cam F is brought opposite to the lever $F'$ and allows the spring to turn the lever and depress the blade which the lever carries, and to depress the blade more and more as succeeding courses are made on the frame-needles. When the desired number of courses have been made on the frame-needles, the push-back is, by the formation of the cam F, caused to rise so as only to bear upon the next course of work, and after the completion of the next course it again rises and then remains entirely out of action. At the same time the levers $D'$ $E'$, which act upon the cams $D^2$ $E^2$, whereby the machine-needles are actuated, resume their former position, and the machine-needles again come into work, and at the end of a course of work the formation of the welt is completed and the machine goes on making ordinary ribbed work. The driving-pawl at this time goes out of action by reason of the end of the arm $A^9$ passing into the recess $A^{12}$ in the pattern-wheel, as before described, whereby the arm $A^7$ on the vertical axis $A^8$ is free to pass below the projection on the driving-pawl, and so the pawl is upheld. A plan of the cam or pattern wheel is shown at Fig. 12.

When the machine is only to be used for making rib tops, as hereinbefore described with reference to Fig. 3, then the parts $A^7$, $A^8$, $A^9$, and $A^{12}$ are not required.

The above-described improvements can be applied to other constructions of circular-knitting machines producing ribbed work.

Having now particularly described and ascertained the nature of our said invention and in what manner the same is to be performed, we declare that what we claim is—

1. The combination, substantially as set forth, of the circular revolving heads of frame and machine needles, the clearing and knocking-over cams, the notched wheel for lifting when in action some only of the frame-needles, the push-back blade, which can be made to descend between the frame and machine needle heads, the levers for putting these cams and the push-back blade in and out of action, the cams for acting on these levers, the cam-shaft and ratchet-wheel upon it, the pawl giving a step-by-step revolving motion to the ratchet-wheel, the lever carrying the pawl, and the cam on the revolving frame-head to rock this lever.

2. The combination, substantially as set forth, of the circular revolving heads of frame and machine needles, the clearing and knocking-over cams, the notched wheel for lifting when in action some only of the frame-needles, the push-back blade, which can be made to descend between the frame and the machine needles, the cam-shaft, means for giving it a step-by-step revolving motion when a welt is to be formed, and the cams carried by this shaft, one cam to draw back the point of the clearance or knocking-over cam of the frame-needles for one course, one cam to somewhat draw back the cam for knocking over work on the machine or rib needles for one course and then to draw it back entirely out of action until a welt is completed, one cam to draw back and put out of action the cam by which the machine-needles are thrust forward, and one cam to raise and lower the push-back blade.

3. In combination with the circular heads of frame and machine needles of a rib circular-knitting machine, a push-back blade which can be made to descend between the frame and machine needle heads and bear upon the work at times when the machine-needles are left out of work with loops of work hanging upon them, and means for actuating the push-back blade.

4. The combination, substantially as set forth, of the circular revolving heads of frame and machine needles, means for actuating them, the cam-axis, cams on the cam-axis, a push-back blade actuated by one of the cams, the clearing and knock-over cams, connections between these cams and cams on the cam-axis, the toothed wheel on the cam-axis, the driving-pawl engaging therewith, means for actuating the pawl, the arm engaging with the pawl to hold it out of engagement with the wheel, the vertical axis to which the arm is secured, and the second arm on the vertical axis, which engages with one of the cams, for the purpose specified.

5. The combination, substantially as set forth, of the circular revolving heads of frame and machine needles, means for actuating them, the pattern-wheel, its shaft, the toothed wheel thereon, which is provided with a guard $c$ around part of its circumference, the pawls $a$ and $b$, engaging with the toothed wheel, and one of which rides on the guard during a part of the revolution of the wheel, and means for actuating the pawls.

6. In a circular-knitting machine, the combination, substantially as set forth, of the spring-actuated clearing-cam $C^4$, the lever $C^3$, connected therewith, the lever $C'$, the plunger $C^2$, interposed between the levers $C'$ and $C^3$, the cam $C$, having a recess into which a projection on the lever $C'$ enters, and means for actuating the cam $C$.

JOHN HARRIS COOPER.
GEORGE BLUNT.

Witnesses:
Jos. Barber Haxby,
*Solicitor, Leicester.*
Jno. Barker Waring,
*His Clerk.*